Figure 1:
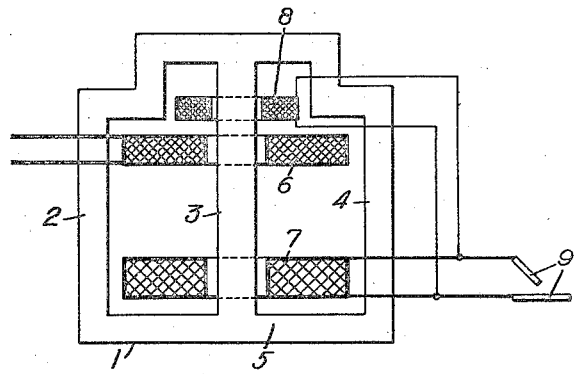

H. FAHNOE.
ARC WELDING SYSTEM.
APPLICATION FILED SEPT. 3, 1919.

1,351,030.   Patented Aug. 31, 1920.

WITNESSES:
J. A. Helsel
O. E. Bee.

INVENTOR
Hans Fahnoe.
BY
ATTORNEY

UNITED STATES PATENT OFFICE.

HANS FAHNOE, OF PITTSBURGH, PENNSYLVANIA, ASSIGNOR TO WESTINGHOUSE ELECTRIC & MANUFACTURING COMPANY, A CORPORATION OF PENNSYLVANIA.

ARC-WELDING SYSTEM.

1,351,030.  Specification of Letters Patent.  Patented Aug. 31, 1920.

Application filed September 3, 1919. Serial No. 321,411.

*To all whom it may concern:*

Be it known that I, HANS FAHNOE, a citizen of the United States, and a resident of Pittsburgh, in the county of Allegheny and State of Pennsylvania, have invented a new and useful Improvement in Arc-Welding Systems, of which the following is a specification.

My invention relates to transformers and particularly to transformers which may be employed in alternating-current-arc welding systems. The primary object of my invention is to construct transformers which shall improve the starting characteristics of alternating-current-arc welding systems.

The numerous advantages of alternating-current-arc welding systems have been recognized, but certain difficulties, which have been met, have prohibited, to a certain extent, the general utilization of alternating currents for arc welding. One of the main obstacles which I have encountered in extensive tests has been the difficulty with which an arc may be started by means of alternating current. One object of my invention resides, therefore, in the provision of means for facilitating the establishing of an arc in an alternating-current welding system.

I have found that, by increasing the normal operating-current value, an arc may be more readily drawn. Another object of my invention is the construction of transformers in which automatic regulation may be incorporated to provide a relatively high starting current which may subsequently be reduced to a desirable operating value.

With these and other objects in view, my invention will be more fully described, illustrated in the drawings, in the several views of which corresponding numerals indicate like parts, and then particularly pointed out in the claims.

Figure 2:
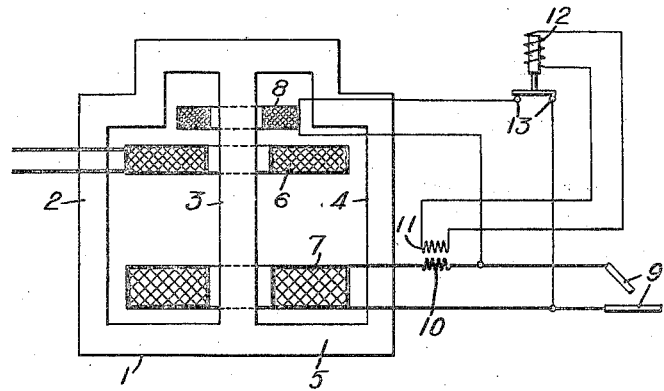

In the drawings, Figure 1 is a diagrammatic view of a transformer suitably connected to provide a welding system which embodies my invention, and Fig. 2 is a similar view illustrating a modification of my invention.

In practising my invention, I may construct a transformer which may be employed for arc welding by means of alternating current without additional or complicated apparatus. I have found that a transformer may be constructed which improves the starting characteristics of an alternating-current welding system by employing the usual type of laminated core formed with three legs, the central one of which may carry a plurality of windings, including a primary and a secondary winding. I have found that the starting characteristics may be distinctly improved by disposing an additional winding upon the central leg of the transformer. The additional winding may be connected in parallel relation to the secondary winding which, in turn, may be connected to the welding electrodes, the primary winding being, of course, connected to a suitable source of alternating current.

An auxiliary winding employed in this manner tends to increase the strength of the current supplied to the electrodes, which increase may be automatically reduced to a fractional value of the normal welding current after an arc has been established between the electrodes. By employing the modified form of my invention, the auxiliary winding may be entirely eliminated from the system after an arc has been established, thereby reducing the relatively heavy starting current to a desirable operating value.

In Fig. 1 is shown a transformer comprising a core member 1 having a plurality of legs 2, 3 and 4 which are connected, at one end, by a straight member 5 and are so constructed, at their other ends, as to provide restricted openings between the outer legs 2 and 4 and the central leg 3, the purpose of which will be clearly understood from the following description. A primary winding 6 and a secondary winding 7, together with an auxiliary winding 8, may be disposed about the central leg 3, the restricted openings at the top of the assembled core permitting of movement of the small auxiliary winding 8 and also limiting the movement of the primary winding 6.

The primary winding 6 may, of course, be connected to a suitable source of alternating current, and the secondary winding 7 may be connected to a plurality of electrodes 9. The auxiliary winding 8 is preferably connected in parallel relation to the secondary winding 7, as shown in the drawings. It will be understood that the relative positions of the primary and secondary windings may be interchanged, if desired, to provide a movable secondary winding and a stationary primary winding.

In operation, the above described transformer improves the starting characteristics of an alternating-current welding system on account of the fact that, when the system is in readiness to start welding, the winding 6 and the auxiliary winding 8 are in close proximity to the secondary winding 7. It will be appreciated that, owing to the relative disposition of the windings, as here shown, the primary winding 6 and the auxiliary winding 8 are free to move, while the secondary winding 7 is substantially stationary.

When the electrodes 9 are short-circuited, preliminary to establishing an arc, a relatively high starting current is drawn which is due to the inductive action between the primary and secondary windings, which action is supplemented by the auxiliary winding 8. When the electrodes are separated, and an arc established between them, the primary winding 6 and the auxiliary winding 8 are repelled by the secondary winding 7, and move along the central leg 3, the movement of the primary winding being limited by the restricted portion at the end of the core member which permits of further movement of the auxiliary winding 8.

It will be apparent that the movement of the windings, as above described, when an arc is established, will cause a reduction in the current flowing between the welding electrodes, on account of the increased reactance in the transformer and on account of the fact that only a very small fraction of current flows in the auxiliary winding 8.

In the modified form of my invention, shown in Fig. 2, the same transformer construction is employed but a means for opening the circuit of the auxiliary winding 8 is provided. A current transformer, having a primary winding 10 and a secondary winding 11, may be employed by connecting the primary winding 10 in series with one of the electrodes 9, and a secondary winding 11 thereof may be connected to a coil 12 of a relay switch having its contact members 13 connected in the circuit of the auxiliary winding 8 which is connected in parallel relation to the secondary winding 7. If such construction is employed, the auxiliary winding 8 may be made stationary, if so desired, and the initial starting current in the welding system may be reduced by opening the circuit of this winding.

For example, in operation, the primary winding 6 is connected to a suitable source of current supply, and, when the electrodes 9 are engaged preliminary to establishing an arc, the bridging member of the relay switch engages the contacts 13, thereby connecting the auxiliary winding 8 in parallel relation to the secondary winding 7. The action of the winding 8 will, therefore, supplement the action of the winding 7 and cause a relatively heavy current to flow between the short-circuited electrodes. However, the heavy flow of current is automatically reduced, because the coil 12 of the relay switch is energized by the current which is induced in the secondary winding 11 of the current transformer, the coil 12 removing the bridging member from the contacts 13. The purpose of the initial starting current, however, is accomplished as soon as the electrodes have been heated by the momentary heavy current, the heating of the work materially facilating the establishing of an arc when the electrodes are separated. The operation of the transformer shown in Fig. 2, is an application of the same principle embodied in the transformer shown in Fig. 1. The only difference between the two systems lies in the fact that the action of the auxiliary winding 8 is decreased in one instance and entirely eliminated in the other.

By employing a transformer constructed as above described, it will be appreciated that the value of the starting current in the welding system may be increased above that of the normal welding-current value without the necessity of any attention of the operator. It is advantageous, in all welding systems, to establish as simple operating conditions as possible in order to permit the operator to give his entire attention to the production of a good weld. On account of the fact that the above described welding systems embody relatively easy starting characteristics, accomplished by simple and automatic means, a distinct advantage is, therefore, gained in the systems.

Although I have specifically described a plurality of transformers constructed in accordance with my invention and pointed out the manner of applying them in alternating-current welding systems, it is obvious that minor changes may be made in their construction and the manner of employing them without departing from the spirit or scope of my invention, and I desire, therefore, that no limitations shall be imposed except such as are indicated in the appended claims.

I claim as my invention:

1. In an arc welding system, a transformer comprising a core member, a plurality of windings mounted thereon including primary and secondary windings and an auxiliary winding, the primary winding being adapted to be connected to a source of alternating current, the secondary winding being connected to a plurality of electrodes and the auxiliary winding being connected in parallel relation to the secondary.

2. An arc welding transformer comprising a core member, primary and secondary windings so mounted thereon as to permit of movement of one of the windings and an auxiliary winding connected in parallel relation to the secondary winding.

3. An arc welding transformer comprising a core member formed with three legs, primary and secondary windings so mounted about the central leg of the core member as to permit of movement of the primary winding and an auxiliary winding mounted upon the central leg of the core member above the primary winding and connected in parallel relation to the secondary winding.

4. An arc welding transformer comprising a core member formed with three legs, one of which is centrally disposed with respect to the other two, primary and secondary windings so mounted about the central leg as to permit of movement of the primary winding, an auxiliary winding connected in parallel relation to the secondary winding so mounted above the primary winding as to be free to move and means for limiting the range of travel of the primary winding below that of the auxiliary winding.

5. An arc welding transformer comprising a core member having three legs so formed as to provide an opening at each side of one of the legs, each of which is correspondingly restricted at one end, primary and secondary windings so mounted upon the core as to occupy a portion of the openings therein and permit of movement of the primary winding to an extent limited by the walls of the restricted openings and an auxiliary winding so mounted upon the core above the primary winding as to be free to move into the restricted portion of the openings.

6. An arc welding system comprising a transformer including a core member, a primary winding mounted thereon and connected to a source of alternating current, a secondary winding mounted upon the core member and connected to a plurality of electrodes and an auxiliary winding connected in parallel relation to the secondary winding, the windings being closely coupled on open-circuit conditions and loosely coupled on closed-circuit conditions.

7. An arc welding system comprising a transformer including a core member, a primary winding mounted thereon and connected to a source of alternating current, a secondary winding mounted upon the core member and connected to a plurality of electrodes and an auxiliary winding mounted upon the core member and connected in parallel relation to the secondary winding, and automatic means for opening the connections between the auxiliary winding and the secondary winding.

In testimony whereof I have hereunto subscribed my name this 26th day of Aug., 1919.

HANS FAHNOE.